US005827745A

United States Patent [19]

Astle

[11] Patent Number: 5,827,745

[45] Date of Patent: Oct. 27, 1998

[54] MICROPIPETTE TIP LOADING AND UNLOADING DEVICE AND METHOD AND TIP PACKAGE

[76] Inventor: Thomas W. Astle, 607 Harborview Rd., Orange, Conn. 06477

[21] Appl. No.: 38,533

[22] Filed: Mar. 29, 1993

[51] Int. Cl.$^{6}$ .................................................... G01N 35/10

[52] U.S. Cl. ............................. 436/54; 477/58; 477/100; 477/104; 206/443; 206/503; 206/562; 206/821; 73/863.32; 73/564.24

[58] Field of Search ............................ 73/863.32, 864.24; 422/64, 65, 58, 100, 104; 206/443, 503, 562, 821; 436/54, 49, 180

[56] References Cited

U.S. PATENT DOCUMENTS

| | | | |
|---|---|---|---|
| D. 271,239 | 11/1983 | Lemieux et al. | D24/32 |
| 3,853,217 | 12/1974 | Scordato et al. | 206/223 |
| 3,873,268 | 3/1975 | Mckie, Jr. | 422/58 X |
| 3,937,322 | 2/1976 | Cohen | 206/216 |
| 4,106,911 | 8/1978 | Marcelli | 73/863.32 X |
| 4,160,803 | 7/1979 | Potts | 422/104 X |
| 4,187,724 | 2/1980 | Citrin | 73/425.4 |
| 4,242,834 | 1/1981 | Olsen | 206/562 X |
| 4,349,109 | 9/1982 | Scordato et al. | 206/562 |
| 4,565,100 | 1/1986 | Malinoff | 422/100 X |
| 4,676,377 | 6/1987 | Rainin et al. | 206/508 |
| 4,824,641 | 4/1989 | Williams | 422/100 |
| 4,824,642 | 4/1989 | Lyman et al. | 422/100 |
| 4,863,695 | 9/1989 | Fullemann | 422/100 |
| 4,936,152 | 6/1990 | Aldred | 73/863.32 |
| 5,057,282 | 10/1991 | Linder | 422/104 |
| 5,061,449 | 10/1991 | Torti et al. | 422/104 X |
| 5,063,790 | 11/1991 | Freeman et al. | 422/100 X |
| 5,232,669 | 8/1993 | Pardinas | 206/562 |

FOREIGN PATENT DOCUMENTS

| | | | |
|---|---|---|---|
| 3342504 | 6/1985 | Germany | 422/100 |
| 4145370 | 5/1992 | Japan | 422/100 |

OTHER PUBLICATIONS

The Cole–Palmer Instrument Company Catalogue, pp. 258, 268, 269, 829; 1992.

*Primary Examiner*—Milton Cano
*Attorney, Agent, or Firm*—John H. Crozier

[57] ABSTRACT

Apparatus for loading onto a pipettor a plurality of micropipette tips, the pipettor having a plurality of tip pins depending from a head portion, the tips each having an upper, hollow, tapered, generally cylindrical barrel portion and lower, hollow, generally cylindrical aspirating tip portion, both lying along a common vertical axis and being cojoined at a horizontal shoulder, and the tips being frictionally held in a tip package, the apparatus comprising: a horizontal pusher plate to simultaneously engage the shoulder on each of the tips and to simultaneously raise the tips for insertion of the tip pins therein. In a further aspect of the invention, there is provided a micropipette tip package for such tips, the tip package including: a generally hollow housing having four cojoined sidewalls depending from a horizontal cojoined upper surface to define an open skirt; the upper surface having defined therein a plurality of openings to accommodate therein the distal ends of the upper portion of the tips; a horizontal internal supper plate in the housing having defined therein a plurality of openings to accommodate therein the proximal ends of the upper portions of the tips; and corresponding pairs of the openings in the internal support plate and the upper surface being vertically aligned coaxially so that the micropipette tips can be supported in a vertical position in the package and releasably held therein by interference fits.

18 Claims, 6 Drawing Sheets

MICROPIPETTE TIP LOADING AND UNLOADING DEVICE AND METHOD AND TIP PACKAGE

BACKGROUND OF THE INVENTION

1. Field of the Invention

The present invention relates to pipettors generally and, more particularly, but not by way of limitation, to a novel package for supporting micropipette tips and pipettor loading and unloading apparatus and method.

2. Background Art

In the field of biotechnology and clinical testing, there is an ever increasing need to perform a larger number of tests. In the clinical field, this may take the form of running duplicate and triplicate tests to assure accuracy, particularly as the tests become more sensitive, i.e., more prone to slight error. In the biotechnology field, such as pharmaceutical research, this may take the form of screening large numbers of unknowns for bioactivity. The use of small volumes of reagents, combined with high throughput sample processing equipment, has made the process economically feasible. The novel device disclosed in this application relates to pipetting samples into test receptacles for use in these applications.

The present state of the art has evolved around the de facto standard of testing in 96 test wells arranged in a test plate on 8×12 matrix on 9-mm centers. Test reagents and samples are pipetted into these wells with either single tip or multiple tip pipettors of 8 or 12 micropipettor tips. The pipettors are either manually operated or mechanically driven. To preclude carryover, and, thus, cross contamination between wells, provisions are made to change the micropipette tips as required.

To meet this need, pipette tips are supplied racked in the 8×12 format to align with either a single tip, an 8-tip or a 12-tip pipettor assembly. The operator or a mechanical device forces the pipettor into the tip openings. The pipettor itself has a taper end to correspond to the mating taper of the pipette tip. Forcing the pipettor mechanism down into the racked tips mates the taper fit. The tip is secured to the pipettor by the resulting friction fit. The tip rack must be rigid enough to not bow in the center when multiple tips are to be loaded on the pipettor. Since the tips are not secured in the rack, raising the pipettor withdraws the attached tips from the rack.

This method of packaging tips is adequate if no more than a single row of 8 or 12 tips is to be acquired at a time. It would not be suitable for loading multiple rows. By definition, the tips cannot be retained in the rack, since it would preclude their removal from the rack. This necessitates a clearance fit. There is no problem inserting the pipettor into one tip, since the operator merely directs the taper end into the single tip. This becomes more complex if 8 tips are to be loaded simultaneously and the limit of practicality is reached when a row of 12 tips is to be loaded. That is the limit of one row in the conventional 8×12 matrix.

When the 8 or 12 micropipette tips need to be changed, they are removed from the pipettor and comprise a pile of 8 or 12 loose tips. This can be messy to handle and can represent a personnel hazard in the case they the tips are contaminated with bio-hazardous material.

The next advance in pipettors will be a 96-well pipettor system. The majority of test protocols utilize a common reagent in all 96 wells. For the 96-well pipettor, a different tip racking system is required.

Accordingly, it is a principal object of the present invention to provide a support package for 96 micropipette tips.

It is a further object of the invention to provide such a package that permits all 96 tips to be inserted on a pipettor simultaneously and to be simultaneously removed therefrom.

It is an additional object of the invention to provide such a package that furnishes protection for the pipette tips.

It is another object of the invention to provide such a package that can be conveniently stacked with other such packages.

Yet a further object of the invention is to provide such a package that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for loading onto a pipettor a plurality of micropipette tips, said pipettor having a head portion with a plurality of tip pins depending therefrom, said micropipette tips each having an upper, hollow, tapered, generally cylindrical barrel portion and a lower, hollow, generally cylindrical aspirating tip portion, both lying along a common vertical axis and being cojoined at a horizontal shoulder, and said micropipette tips being frictionally held in a micropipette tip package, said apparatus comprising: a horizontal pusher plate to simultaneously engage said shoulder on each of said micropipette tips and to simultaneously raise said micropipette tips for insertion of said tip pins therein. In a further aspect of the invention, there is provided a micropipette tip package for micropipette tips each having an upper, hollow, tapered, generally cylindrical barrel portion joined to a lower, hollow, generally cylindrical, aspirating tip portion, both lying along a common vertical axis, said micropipette tip package comprising: a generally hollow housing having four cojoined sidewalls depending from a horizontal cojoining upper surface to define an open skirt; said upper surface having defined therein a plurality of openings to frictionally engagingly accommodate therein the distal, wider, ends of a said upper portion of a said micropipette tip; a horizontal internal support plate disposed in said housing and spaced from said upper surface, said internal support plate having defined therein a plurality of openings to frictionally engagingly accommodate therein the proximal, narrower, end of a said upper portion of a said micropipette tip; and corresponding pairs of said openings in said internal support plate and said upper surface being vertically aligned coaxially so that said micropipette tips can be supported in a vertical position in said package and releasably held therein by interference fits at said upper surface and said internal support plate.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
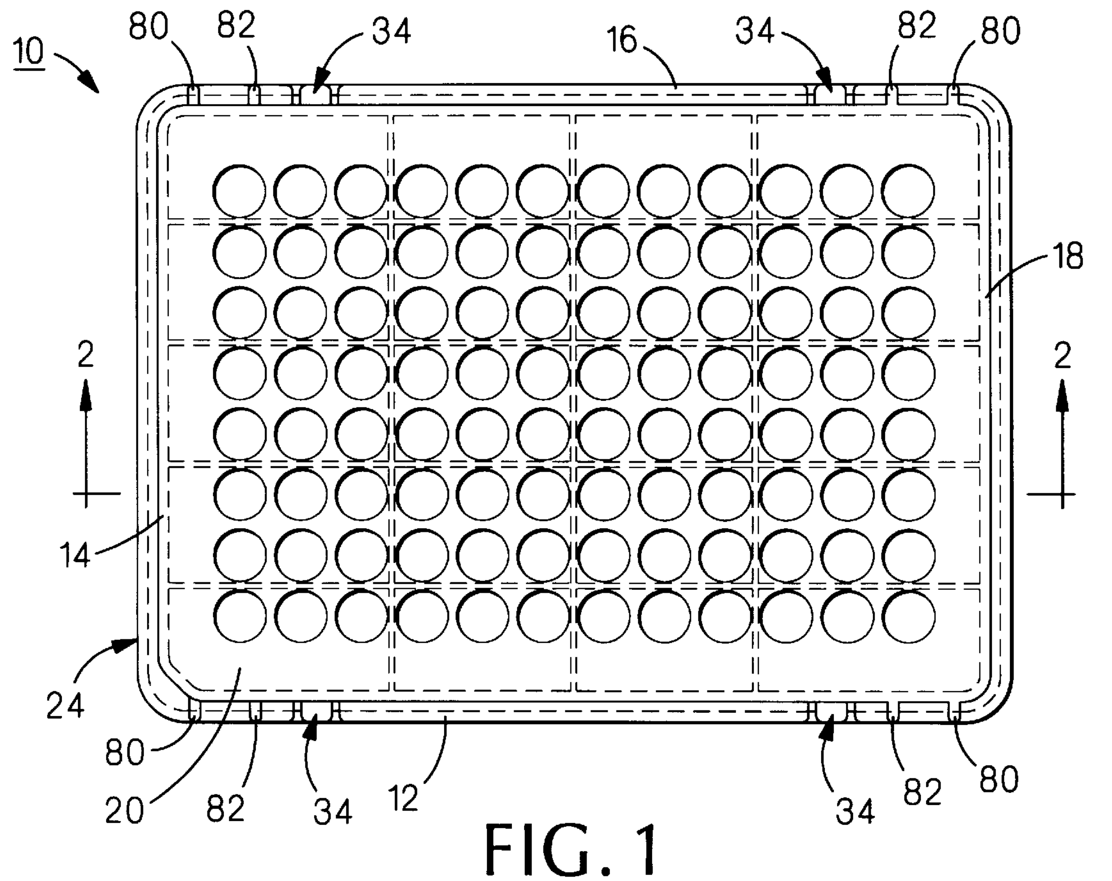
FIG. 1 is top plan view of a micropipette tip rack according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Referring first to FIGS. 1–4, there is illustrated a micropipette rack according to the present invention, generally indicated by the reference numeral 10. Rack 10 includes a generally rectilinear housing formed by four, cojoined, generally vertical walls 12, 14, 16, and 18 (FIG. 1). A horizontal top surface 20 (FIG. 2) joins the upper edges of walls 12, 14, 16, and 18. An inward step 24 (FIG. 2) is defined around the upper portions of walls 12, 14, 16, and 18. A horizontal internal support plate 30 (FIGS. 2, 3) is disposed between walls 12, 14, 16, and 18 and is spaced below top surface 20. Internal support plate 30 is removably secured in micropipette rack 10 by means of four outwardly disposed flanges 32 (FIG. 3) which are snapped into corresponding openings 34 (FIGS. 1 and 4) defined in walls 12, 14, 16, and 18 by means of the temporary resilient deformation of the internal support plate.

Figure 2:
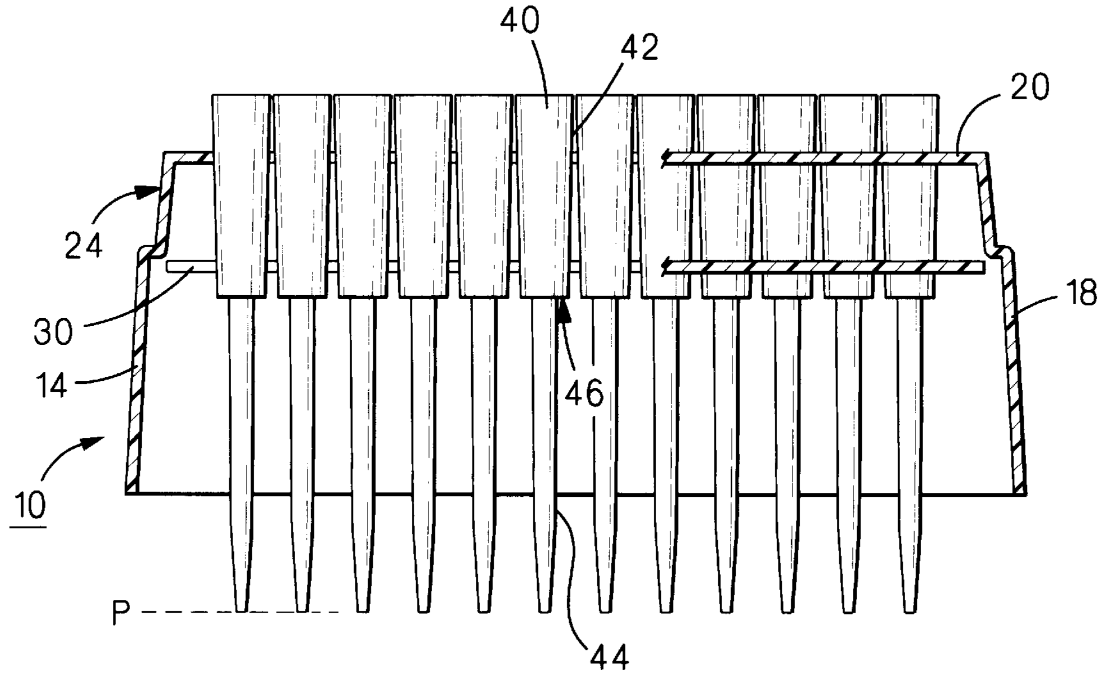
FIG. 2 is a cross-sectional view of the rack taken along the line "2—2" of FIG. 1.

Rack 10 is configured to support therein a plurality of micropipette tips, as at 40 (FIG. 2). A micropipette tip 40 includes an upper, hollow, tapered, generally cylindrical barrel portion 42 and a lower, hollow, generally cylindrical aspirating tip portion 44, both lying along a common vertical axis and being joined at a horizontal shoulder 46.

Figure 3:
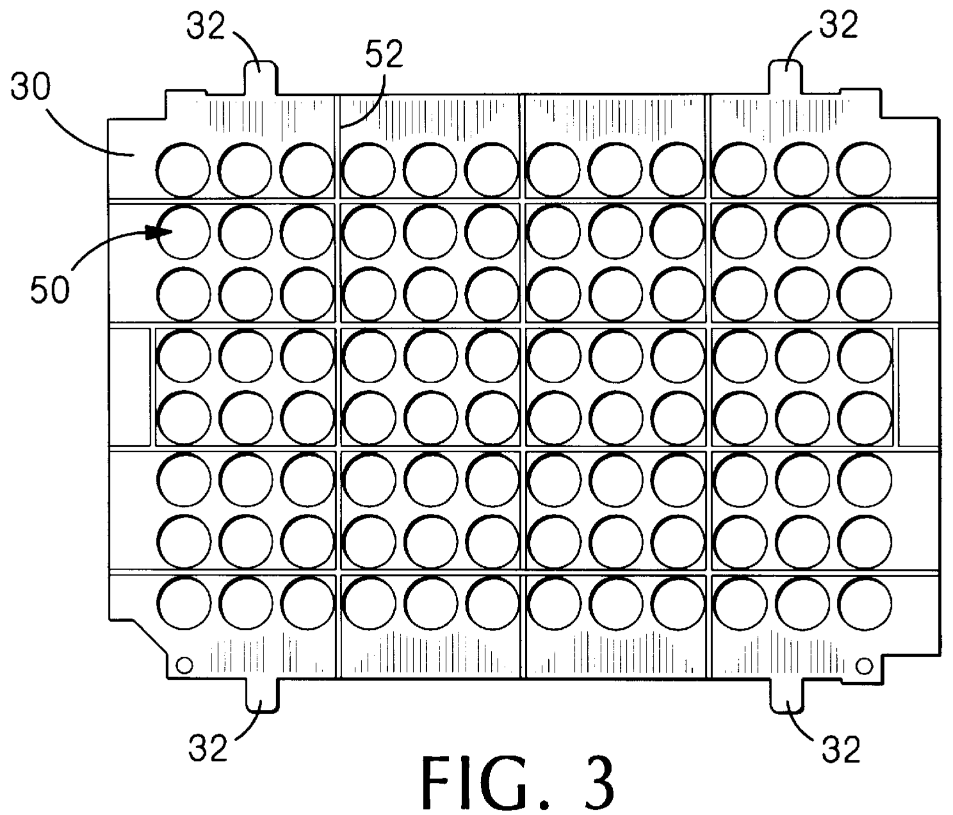
FIG. 3 is a bottom plan view, looking up, of an internal support surface of the tip rack.

Internal support plate 30 has defined therein a plurality of openings, as at 50 to frictionally engagingly accommodate therein the proximal, narrower, end of upper barrel portion 42 of micropipette tip 40 (FIG. 2). Internal support plate 30 has, on the bottom thereof, a raised reinforcing grid 52 (FIG. 3).

Figure 4:
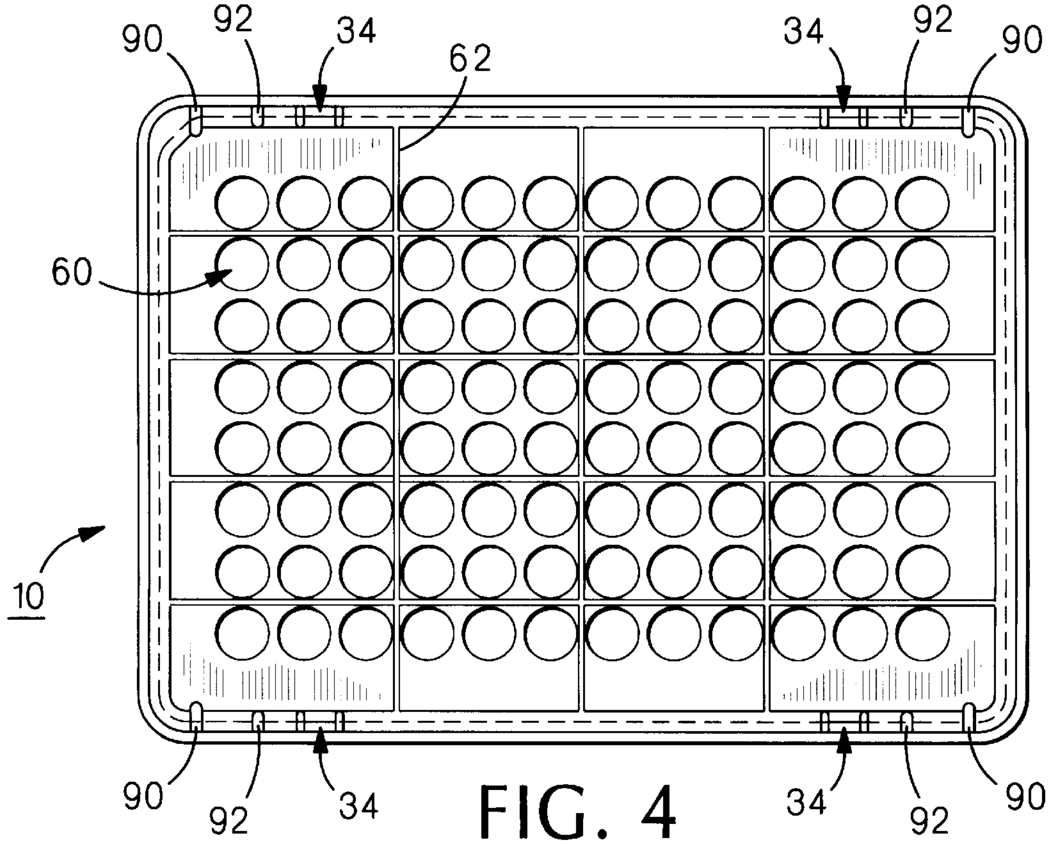
FIG. 4 is a bottom plan view, looking up, of the rack with the internal support surface of FIG. 3 removed.

Top support surface (FIG. 4) has defined therein a plurality of openings, as at 60, to frictionally engagingly accommodate therein the distal, wider, ends of upper portion 42 of micropipette tips 40. Top surface 20 has, on the bottom thereof, a raised reinforcing grid 62 (FIG. 4). Corresponding pairs of openings 50 and 60 are vertically aligned coaxially (FIG. 2).

So arranged, micropipette tips 40 are supported in a vertical position in package 10 and are releasably held therein by interference fits at top surface 20 and at internal support plate 30. This two-point support maintains the precise alignment of the tips to mate with the pipettor assembly (not shown).

Since all micropipette tips 40 are identical, they may be loaded in package 10 (FIG. 2) and through use of a common horizontal plate (not shown) they are pressed into position in the package with the distal ends of the aspirating tips lying in a common plane, "P". The latter is essential in a pipetting operation.

Figure 5:
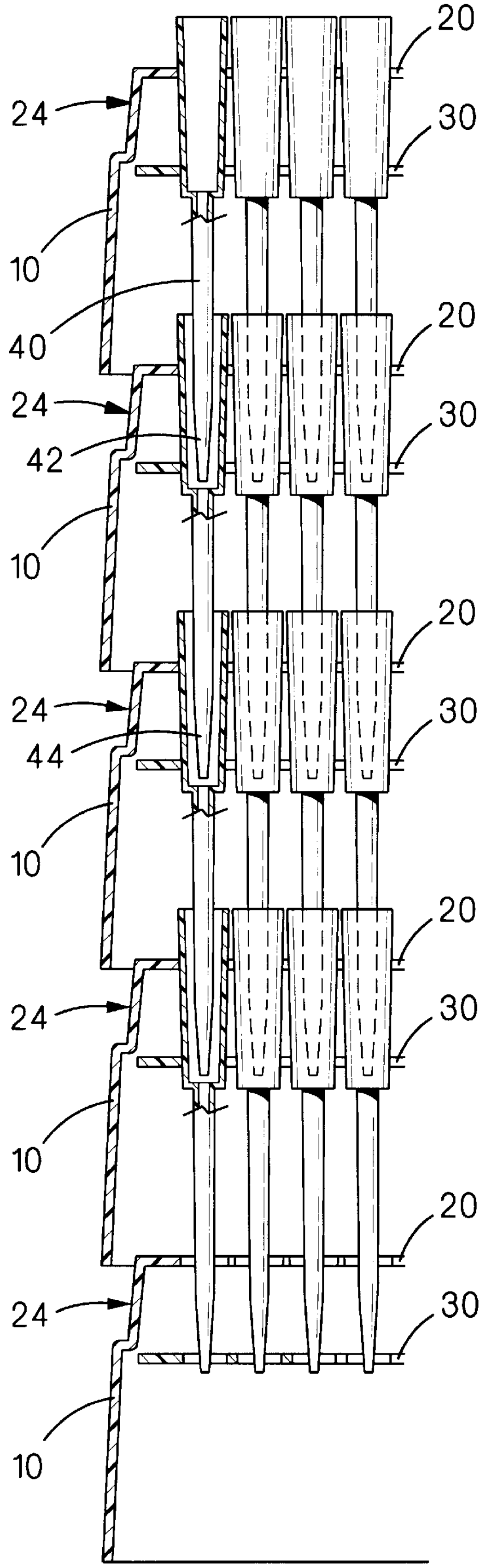
FIG. 5 is a fragmentary cross-sectional view of a plurality of stacked micropipette tip racks.

During shipping and handling, it is essential that the dispensing/aspirating opening of aspirating tip portion 44 be protected from damage. FIG. 5 illustrates how this is accomplished, whereon a plurality of packages 10 are shown in stacked relationship. The lower portion of one package 10 forms a skirt which nests with ledge 24 on another package 10 immediately below. With the packages so stacked, the dispensing/aspirating opening in aspiration tip portion 44 is safely suspended in free air inside the hollow barrel portion 42 of the micropipette tip 40 in the package 10 immediately below. An empty package 10 is then used at the bottom of the stack.

Figure 6:
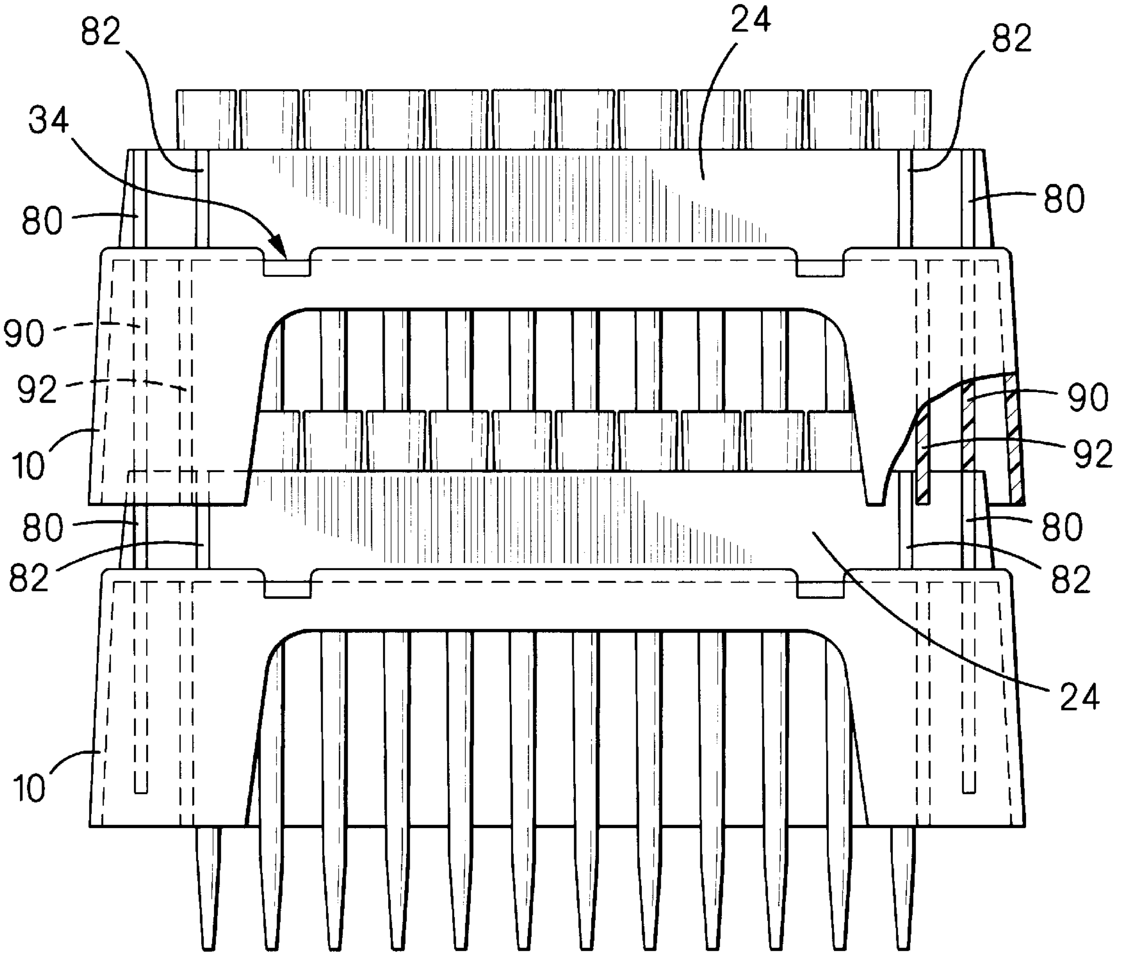
FIG. 6 is a side elevational view, partially in cross-section and partially cut-away, of two stacked micropipette tip racks.

FIG. 6 illustrates how racks 10 shown on FIG. 5 are supported one from the other. Referring first to FIG. 1, it will be noted that there is a first set of four, integral, external, vertical flanges 80 disposed along the outer surface of ledge 24 near the outer edges of vertical walls 12 and 16, and a second set of four, integral, external vertical flanges 82 disposed along the outer surface of the ledge somewhat inwardly from flanges 80. Referring to FIG. 4, it will be noted that there is a first set of four, integral, internal, vertical flanges 90 disposed along the inner surface of walls 12 and 16 near the outer edges thereof, and a second set of four, integral, internal vertical flanges 92 disposed along the walls somewhat inwardly from flanges 90. Flanges 92 extend to the bottom edges of walls 12 and 16, while flanges 90 terminate somewhat above the bottom edges of the walls.

Referring now primarily to FIG. 6, it can be seen that, with upper and lower racks 10 stacked, the lower edge of a flange 90 on upper the upper rack engages the upper edge of a flange 80 on the lower rack, thus maintaining the upper and lower racks in spaced apart relationship. At the same time, a flange 92 of upper rack 10 engages a flange 80 of lower rack 10 in side-to-side relationship to prevent upper rack 10 from moving to the left on FIG. 6 relative to lower rack 10, while similar engagement of the other flange 92 prevents the upper rack from moving to the right relative to the lower rack. Engagement of flanges 90 of upper rack 10 with ledge 24 of lower rack 10 prevents relative front to back movement on FIG. 6 of the racks. Thus arranged, racks 10 are relatively vertically and horizontally positionally stable; however, the racks can be removed easily one-by-one from the top of the stack (FIG. 5).

Figure 7:
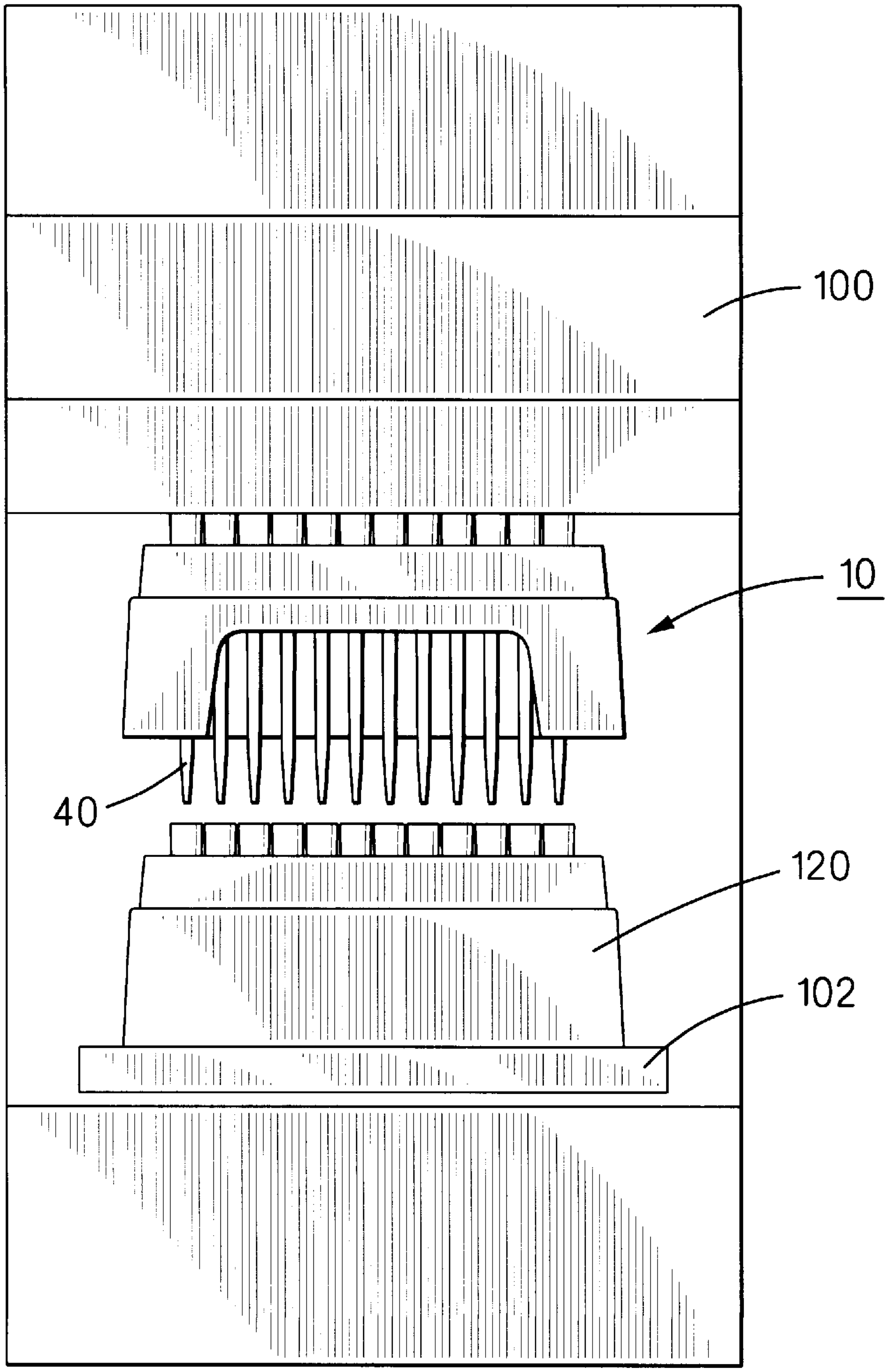
FIG. 7 is a fragmentary front elevational view showing a tip rack with micropipettes therein mounted on a 96-well pipettor.

FIG. 7 shows rack 10 with micropipette tips 40 therein mounted in a 96-well pipettor having a head portion 100 and a horizontally and vertically moving stage 102. Once rack 10 is mounted on pipettor head 100, stage 102 moves a microliter tray 120 into position under rack 10 and elevates the microliter tray so that the ends of micropipette tips 40 are inserted into corresponding wells on the microliter tray. Once the pipetting operation is completed, rack 10 is removed from head 100 with micropipette tips 40 remaining in the rack and the unit can then be reused in the same manner without the micropipette tips ever having been removed from the rack. The method of inserting rack 10 on head portion 100 is described below with reference to FIG. 8.

Figure 8:
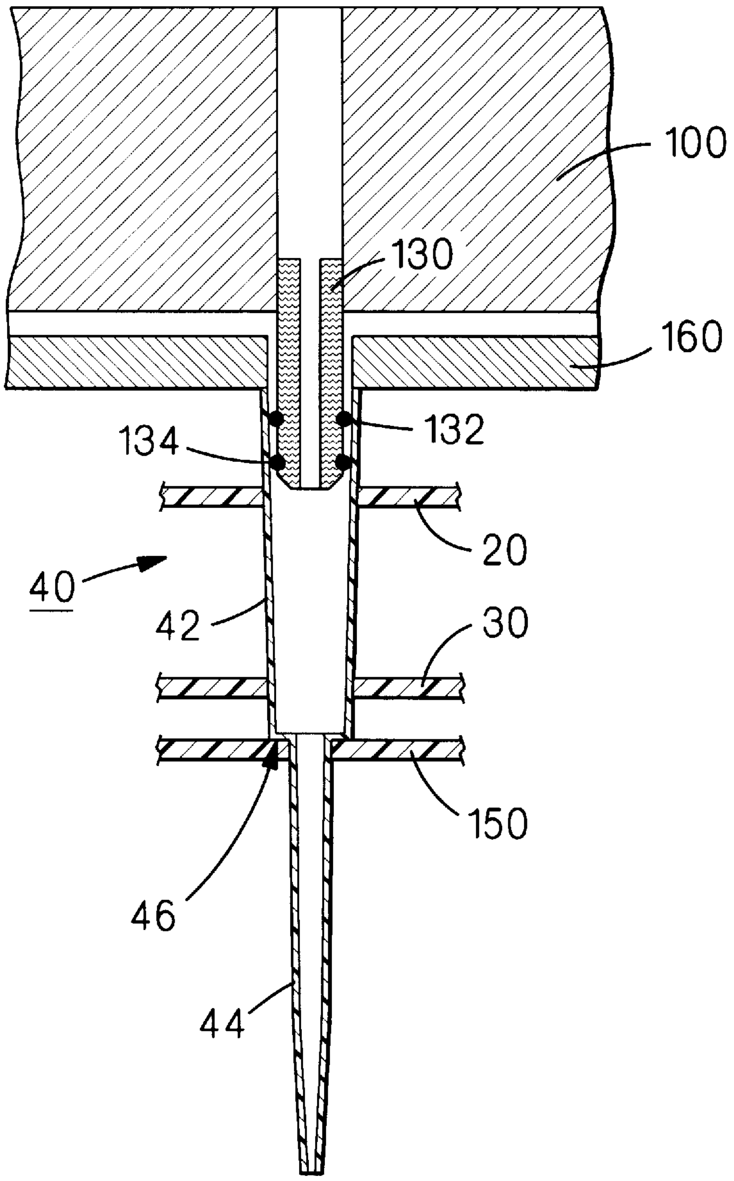
FIG. 8 is a fragmentary view showing a single micropipette mounted on the 96-well pipettor of FIG. 6.

FIG. 8 illustrates a micropipette tip 40 mounted on one of a plurality of tip pins 130 fixed to head 100 and depending vertically from the lower surface thereof. Tip pin 130 has circumferentially disposed therearound two resilient O-rings 132 and 134 which the inner surface of barrel portion 42 engages. Such engagement holds pipette tips 40 vertically aligned in place on head 100, with rack 10 now hanging from the micropipette tips.

Micropipette tip 40 has been placed in such position by a horizontal pusher plate 150 which is inserted into the lower opening of package 10 and elevated to engage shoulder 46 on each micropipette. The pusher plate is then further raised so that barrel portions 42 of micropipette tips 40 are inserted over tip pins 130. Since micropipette tips 40 slide easily over O-rings 132 and 134, the micropipettes are parallely mounted on tip pins 130 with the lower ends of the micro-plates lying in a common horizontal plane (FIG. 2). This is in contrast to the conventional method of loading a single row of micropipette tips to tip pins with a tapered fit, in which method micropipette pins in the center of the row tend to be loose and, therefore, the lower ends of the tips may not lie in a common horizontal plane.

To remove rack 10 with micropipette tips 40 therein from head 100, a horizontal tip eject plate 160 which engages the upper ends of barrels 42 is lowered, forcing micropipette tips 40 off tip pins 130. Since micropipette tips 40 are still frictionally engaging top 20 and internal support 30 of rack 10, the rack and the micropipette tips remain as a single unit for reuse.

Retaining micropipette tips 40 in package 10 provides another advantage. After use, micropipette tips 40 may be contaminated with bio-hazardous material and by retaining all tips in package 10, there is only one unit to dispose of instead of 96 units.

Rack 10 and micropipette tips 40 may be economically manufactured by the conventional injection molding of a suitable polymeric material.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A micropipette tip package for micropipette tips each having an upper, hollow, tapered, generally cylindrical barrel portion joined to a lower, hollow, generally cylindrical, aspirating tip portion, both lying along a common vertical axis, said micropipette tip package comprising:

(a) a generally hollow housing having four cojoined sidewalls depending from a horizontal cojoining upper surface to define an open skirt;

(b) said upper surface having defined therein a plurality of openings to frictionally engagingly accommodate therein the distal, wider, ends of said upper portions of a said micropipette tips;

(c) a horizontal internal support plate disposed in said housing and spaced from said upper surface, said internal support plate having defined therein a plurality of openings to frictionally engagingly accommodate therein the proximal, narrower, ends of said upper portions of a said micropipette tips; and (d) corresponding pairs of said openings in said internal support plate and said upper surface being vertically aligned coaxially so that said micropipette tips can be supported in a vertical position in said package and releasably held therein by interference fits at said upper surface and said internal support plate.

2. A micropipette tip package, as defined in claim 1, further comprising:

(a) said sidewalls being dimensioned such that, when said micropipette tips are supported in said package, the lower ends of said micropipette tips will extend below the lower edges of said sidewalls;

(b) a plurality of said micropipette tip packages being stackable, such that the lower portion of the skirt of one said micropipette tip package can be inserted over and around a said housing of another, lower, said micropipette tip package; and (c) said micropipette tip packages being identically configured, such that, when said micropipette packages are vertically stacked, one upon the other, said lower ends of said micropipette tips in an upper said micropipette tip package will extend into free air in said hollow barrel portions of said micropipette tips in a lower, adjacent said micropipette tip package.

3. A micropipette tip package, as defined in claim 1, wherein, when said micropipette tips are supported in said micropipette tip package, all the lower distal ends of said micropipette tips lie in a common horizontal plane.

4. A micropipette tip package, as defined in claim 1, wherein said micropipette tip package supports 96 micropipette tips.

5. A method of loading onto a pipettor a plurality of micropipette tips, said method comprising:

(a) providing said pipettor having a head portion with a plurality of tip pins depending therefrom, and said micropipette tips each having an upper, hollow, tapered, generally cylindrical barrel portion and a lower, hollow, generally cylindrical aspirating tip portion, both lying along a common vertical axis and being cojoined at a horizontal shoulder, and said micropipette tips being held in a micropipette tip package; and (b) simultaneously engaging said shoulder on each of said micropipette tips and raising said micropipette tips for insertion of said tip pins therein, with said micropipette tip package remaining attached to said micropipette tips.

6. A method as defined in claim 5, further comprising: providing each of said tip pins with two resilient, horizontal O-rings about the outer periphery thereof to frictionally engage the inner surface of said hollow barrel portion of a said micropipette tip when said tip pin is inserted in said hollow barrel portion.

7. A method, as defined in claim 5, further comprising: maintaining said micropipette tip package engaged with said micropipette tips after said micropipette tips are loaded on said tip pins.

8. A method, as defined in claim 5, further comprising: simultaneously engaging the upper edges of said barrel portions of said micropipette tips when said micropipette tips are loaded on said tip pins and moving said micropipette tips downward so as to simultaneously remove said micropipette tips from said tip pins, with said micropipette tip package remaining engaged with said micropipette tips.

9. A method, as defined in claim 5, further comprising: providing said micropipette tips frictionally held in said micropipette package.

10. A pipettor system, comprising:

(a) a pipettor having a head portion with a plurality of tip pins depending therefrom;

(b) a plurality of micropipette tips, said micropipette tips being releasably held in a micropipette tip package, said micropipette tips each having an upper, hollow, tapered, generally cylindrical barrel portion and a lower, hollow, generally cylindrical aspirating tip portion, both lying along a common vertical axis and being cojoined at a horizontal shoulder; and (c) a horizontal pusher plate to simultaneously engage said shoulder on each of said micropipette tips and to simultaneously raise said micropipette tips for insertion of said tip pins therein, with said micropipette tip package remaining attached to said micropipette tips.

11. A system, as defined in claim 10, wherein each of said tip pins has two resilient, horizontal O-rings about the outer periphery thereof to frictionally engage an inner surface of said hollow barrel portion of a said micropipette tip when said tip pin is inserted in said hollow barrel portion.

12. A system, as defined in claim 10, further comprising: a horizontal stripper plate disposed between the lower surface of said head and engaging upper edges of said barrel portions of said micropipette tips when said micropipette tips are loaded on said tip pins, said stripper plate being movable downward so as to simultaneously remove said micropipette tips from said tip pins, with said micropipette tip package remaining engaged with said micropipette tips.

13. A system, as defined in claim 13, wherein said micropipette tips are frictionally held in said micropipette tip package.

14. A system, as defined in claim 10, wherein said micropipette tip package comprises:

(a) a generally hollow housing having four cojoined sidewalls depending from a horizontal cojoining upper surface to define an open skirt;

(b) said upper surface having defined therein a plurality of openings to frictionally engagingly accommodate therein the distal, wider, ends of said upper portions of a said micropipette tips;

(c) a horizontal internal support plate disposed in said housing and spaced from said upper surface, said internal support plate having defined therein a plurality of openings to frictionally engagingly accommodate therein the proximal, narrower, ends of said upper portions of a said micropipette tips; and (d) corresponding pairs of said openings in said internal support plate and said upper surface being vertically aligned coaxially so that said micropipette tips can be supported in a vertical position in said package and releasably held therein by interference fits at said upper surface and said internal support plate.

15. A system, as defined in claim 14, further comprising:

(a) said sidewalls being dimensioned such that, when said micropipette tips are supported in said package, the lower ends of said micropipette tips will extend below the lower edges of said sidewalls;

(b) a plurality of said micropipette tip packages being stackable, such that the lower portion of the skirt of one said micropipette tip package can be inserted over and around a said housing of another, lower, said micropipette tip package; and (c) said micropipette tip packages being identically configured, such that, when said micropipette packages are vertically stacked, one upon the other, said lower ends of said micropipette tips in an upper said micropipette tip package will extend into free air in said hollow barrel portions of said micropipette tips in a lower, adjacent said micropipette tip package.

16. A system, as defined in claim 14, wherein, when said micropipette tips are supported in said micropipette tip package, all the lower distal ends of said micropipette tips lie in a common horizontal plane.

17. A system, as defined in claim 14, wherein said micropipette tip package supports 96 micropipette tips.

18. A system, as defined in claim 14, wherein said horizontal pusher plate engages said shoulders below said internal support plate and within said housing.

* * * * *